US012395893B2

(12) United States Patent
Radunovic et al.

(10) Patent No.: US 12,395,893 B2
(45) Date of Patent: Aug. 19, 2025

(54) TECHNIQUES FOR ADAPTIVELY ALLOCATING RESOURCES IN A CLOUD-COMPUTING ENVIRONMENT

(71) Applicant: Microsoft Technology Licensing, LLC, Redmond, WA (US)

(72) Inventors: Bozidar Radunovic, Cambridge (GB); Sanjeev Mehrotra, Kirkland, WA (US); Yongguang Zhang, Redmond, WA (US); Paramvir Bahl, Bellevue, WA (US); Xenofon Foukas, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/544,984

(22) Filed: Dec. 19, 2023

(65) Prior Publication Data

US 2024/0137812 A1    Apr. 25, 2024

Related U.S. Application Data

(62) Division of application No. 17/323,680, filed on May 18, 2021, now Pat. No. 12,004,013.

(51) Int. Cl.
| | |
|---|---|
| *H04W 28/16* | (2009.01) |
| *G06F 11/32* | (2006.01) |
| *G06F 11/34* | (2006.01) |
| *G06N 20/00* | (2019.01) |
| *H04W 24/10* | (2009.01) |
| *H04W 28/02* | (2009.01) |
| *H04W 72/21* | (2023.01) |
| *H04W 72/23* | (2023.01) |

(52) U.S. Cl.
CPC .......... *H04W 28/16* (2013.01); *G06F 11/324* (2013.01); *G06F 11/3428* (2013.01); *G06N 20/00* (2019.01); *H04W 24/10* (2013.01); *H04W 28/0268* (2013.01); *H04W 72/21* (2023.01); *H04W 72/23* (2023.01)

(58) Field of Classification Search
CPC . H04W 28/16; H04W 28/0268; H04W 72/21; H04W 72/23; H04W 24/10; G06N 20/00; G06F 11/324; G06F 11/3428
USPC ........................................................ 370/252
See application file for complete search history.

(56) References Cited

U.S. PATENT DOCUMENTS

| | | |
|---|---|---|
| 2009/0316904 A1 | 12/2009 | Klingenbrunn et al. |
| 2015/0282070 A1 | 10/2015 | Salem et al. |

(Continued)

OTHER PUBLICATIONS

Notice of Allowance mailed on Jan. 31, 2024, in U.S. Appl. No. 17/323,680, 05 pages.

(Continued)

*Primary Examiner* — Chi Tang P Cheng
(74) *Attorney, Agent, or Firm* — ArentFox Schiff LLP

(57) ABSTRACT

Described are examples for monitoring performance metrics of one or more workloads in a cloud-computing environment and reallocating compute resources based on the monitoring. Reallocating compute resources can include migrating workloads among nodes or other resources in the cloud-computing environment, reallocating hardware accelerator resources, adjusting transmit power for virtual radio access network (vRAN) workloads, and/or the like.

20 Claims, 7 Drawing Sheets

(56) References Cited

U.S. PATENT DOCUMENTS

2020/0275313 A1    8/2020  He et al.
2024/0176762 A1*  5/2024  Manjanatha ........ G06F 11/0757

OTHER PUBLICATIONS

Non-Final Office Action mailed on Nov. 21, 2024, in U.S. Appl. No. 18/596,028, 19 pages.
Notice of Allowance mailed on Feb. 25, 2025, in U.S. Appl. No. 18/596,028, 05 pages.

* cited by examiner

TECHNIQUES FOR ADAPTIVELY ALLOCATING RESOURCES IN A CLOUD-COMPUTING ENVIRONMENT

CLAIM OF PRIORITY UNDER 35 U.S.C. § 119

The present application for patent is a divisional application of U.S. patent application Ser. No. 17/323,680, filed on May 18, 2021, and entitled "TECHNIQUES FOR ADAPTIVELY ALLOCATING RESOURCES IN A CLOUD-COMPUTING ENVIRONMENT," which is assigned to the assignee hereof and hereby expressly incorporated by reference herein for all purposes.

BACKGROUND

Cloud-computing environments are provided for distributed storage and access of software (e.g., services or other applications), files, data, etc. across multiple devices connected via a network, such as the Internet. Using distributed nodes to store data and/or allow execution of the software can improve reliability of the software and data through redundancy, improved on-demand access of the software and data from various other nodes in the network, more efficient execution of software or retrieval of data by using certain nodes or services in the network, and/or the like. A cloud-computing environment can include one or more compute clusters that provide one or more functions. The compute clusters can include a workload that executes on one or more nodes to provide redundant functionality, and a load balancer or router that can balance requests across workloads or route requests based on a characteristic (e.g., an identifier in the request that is associated with one of the workloads). In one specific example, cloud-computing environments can be used to provide mobile edge computing (MEC) where certain functions of a mobile network can be provided as workloads on nodes in the cloud-computing environment.

In MEC, a centralized unit (CU) can be implemented in a back-end node, one or more distributed units (DUs) can be implemented in intermediate nodes, and various remote units (RU), which can provide at least physical (PHY) and/or media access control (MAC) layers of a base station or other radio access network (RAN), or virtual RAN (vRAN), node of the mobile network, can be deployed at edge servers. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc. In addition, the CU, DUs, RUs, or portions thereof, may each execute as a workload on nodes of the cloud-computing environment and/or in a given compute cluster thereof.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for reallocating resources among nodes in a cloud-computing environment is provided that includes monitoring, at a first node in the cloud-computing environment, one or more performance metrics of a virtual radio access network (vRAN) workload that provides wireless network access to one or more user equipment (UEs), and based on comparing the one or more performance metrics to a threshold, transferring execution of one or more non-vRAN workloads to a second node in the cloud-computing environment.

In another example, a computer-implemented method for reallocating resources among nodes in a cloud-computing environment is provided that includes monitoring a traffic load of a vRAN workload that provides wireless network access to one or more UEs, and based on comparing the traffic load to a threshold, reallocating resources of a hardware accelerator to the vRAN workload or one or more other vRAN workloads.

In another example, a computer-implemented method for adjusting transmit power of a cell operated by a vRAN workload in a cloud-computing environment is provided that includes receiving, from one or more second vRAN workloads operating one or more second cells, a measurement of at least a first signal transmitted by a first vRAN workload operating a first cell, computing, based on measurements of at least the first signal as received from the one or more second vRAN workloads, a boundary of the first cell, and adjusting, based on the boundary of the first cell, a transmit power of the first vRAN workload for transmitting signals in the first cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
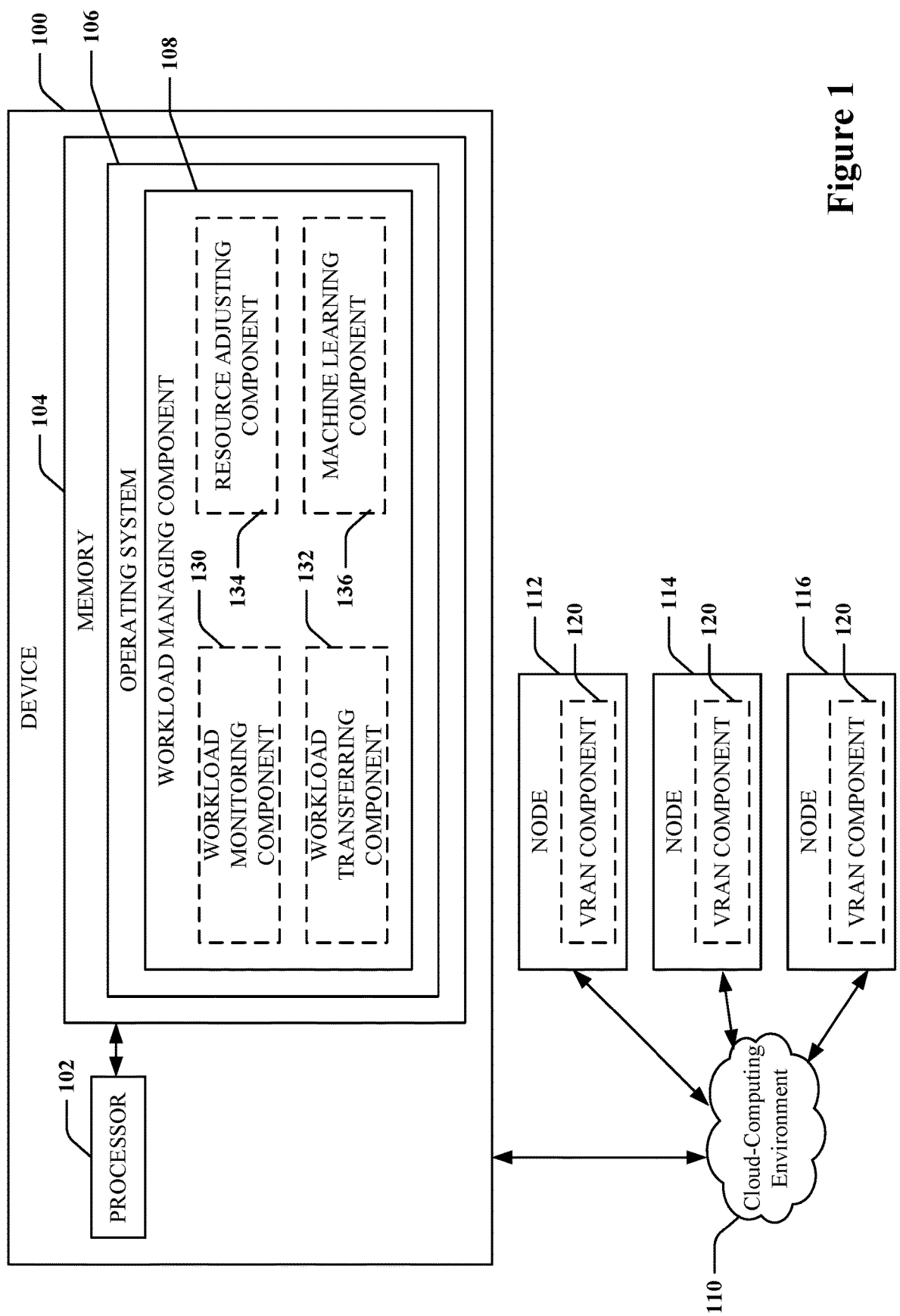
FIG. 1 is a schematic diagram of an example of a device for allocating compute resources in a cloud-computing environment, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to monitoring workloads executing in a cloud-computing environment and allocating, based on the monitoring, compute resources for the workloads to achieve one or more performance goals for the workloads. Accordingly, for example, deployment and/or management of workloads over resources in the cloud-computing environment can be automated without the need for human intervention to achieve the one or more performance goals.

For example, some workloads can be of a high priority or can otherwise specify a high quality of service or workload/node reliability, while some workloads can be of a best efforts priority or can otherwise specify a lower quality of service or workload/node reliability. In an example, the workload priority may be a function of a service level agreement (SLA) defined for the workload. In any case, for example, some nodes, cores, or other resources in a cloud-computing environment can be reserved for best efforts workloads while other nodes, cores, or other resources can be used for both high priority and best efforts workloads. In addition, for example, best efforts workloads can be moved from nodes, cores, or other resources used for both high priority and best effort workloads based on a resource utilization of the nodes, cores, or other resources (e.g., for a high priority workload). In another example, workloads causing interference to high priority workloads can be identified and moved to different nodes, cores, or other resources to mitigate the interference to the high priority workload.

In some examples, the resource allocation concepts described herein can be applied for workloads in a mobile edge computing (MEC) configuration, such as for workloads that operate a virtual radio access network (vRAN) function, such as in a fifth generation (5G) network to one or more user equipment (UEs). For example, a cell load or other performance metric of a workload operating a vRAN function can be monitored, and hardware accelerator resources can be allocated to the workload, or other vRAN function workloads, based on the cell load or other performance metric. In yet another example, the resource allocation can correspond to adjusting a transmit power for a cell corresponding to a workload operating a vRAN function. For instance, a first workload operating a first vRAN function can transmit a signal, which can be received by one or more second workloads operating other vRAN functions. The one or more second workloads can report a received signal strength of the transmitted signal as received at the other vRAN functions, and the transmit power of the first vRAN function can be adjusted to increase or decrease a cell boundary of a cell provided by the first vRAN function.

In the examples described above and further described herein, automated allocation of compute resources in the cloud-computing environment is possible. This can allow the cloud-computing environment to ensure certain performance goals for workloads are met, which may be according to a SLA for the workloads. In these examples, human intervention may not be required to address possible issues in workload performance, such as insufficient resources for execution, resource interference caused by other workloads, hardware accelerator resource waste or misuse, incorrect cell boundary, which may be affected by changes in a radio environment due to blockage, reflection of signals, etc., and/or the like.

Figure 2:
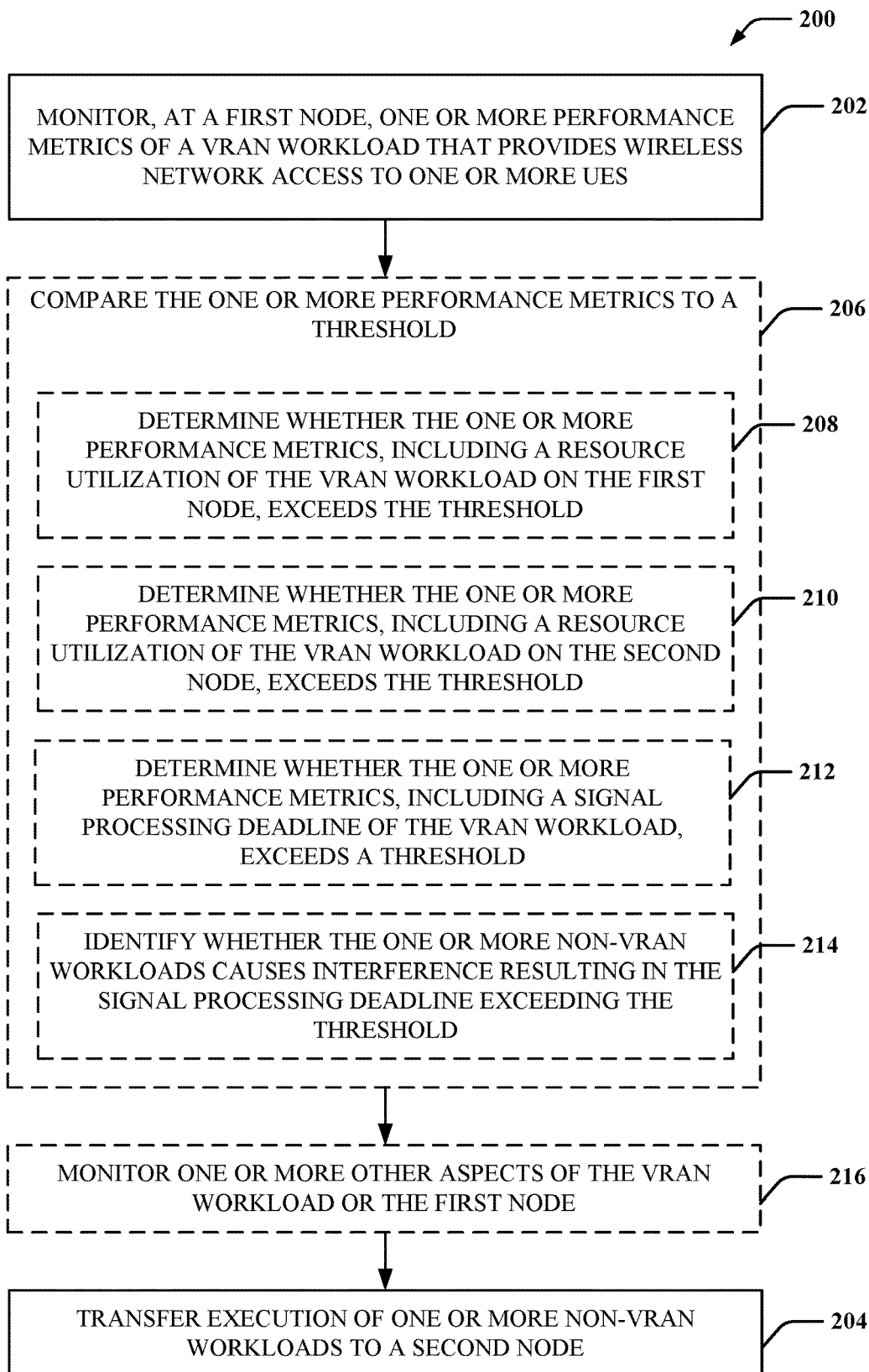
FIG. 2 is a flow diagram of an example of a method for transferring execution of workloads based on monitoring performance of workloads, in accordance with aspects described herein.
Figure 3:
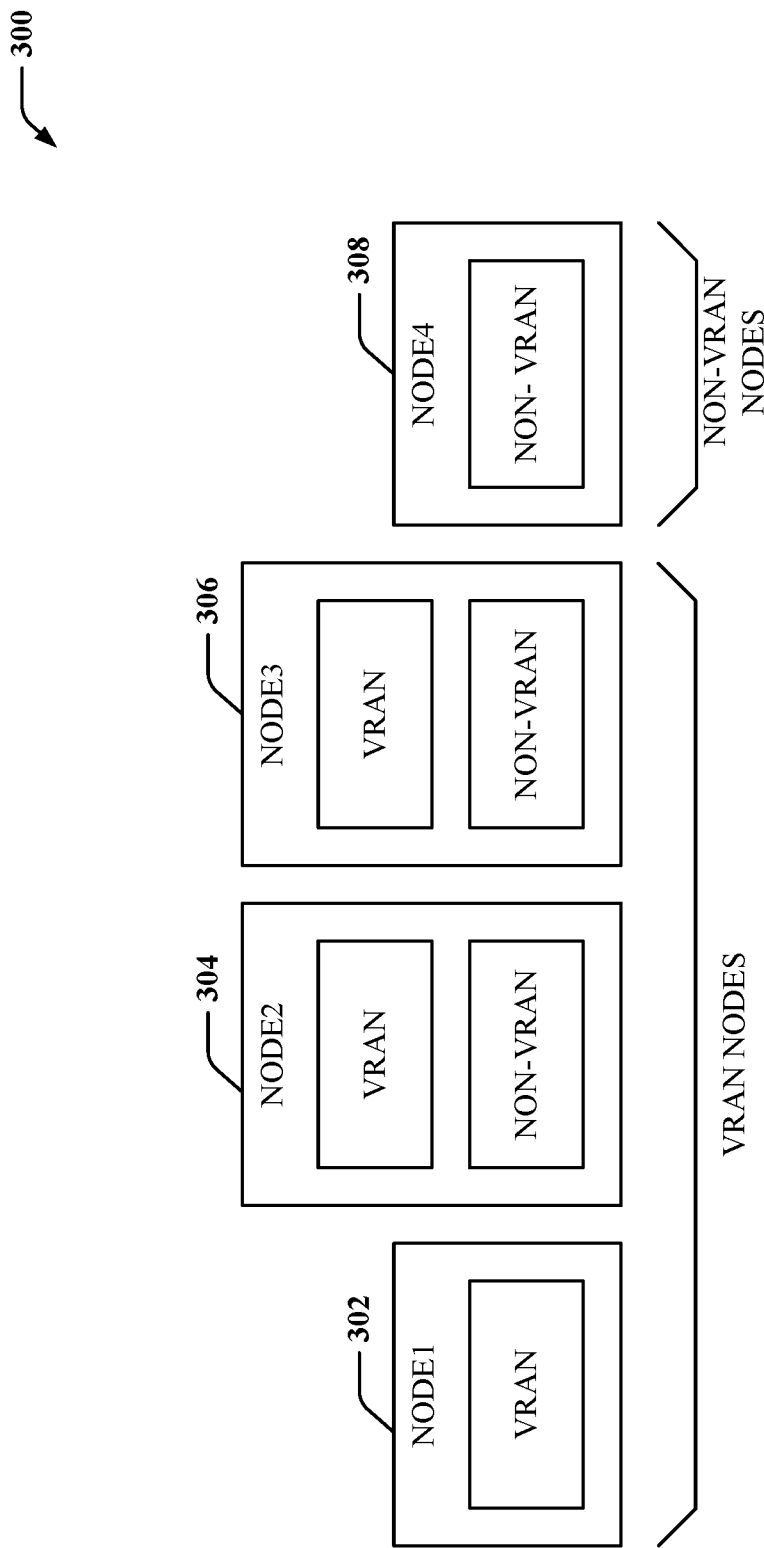
FIG. 3 is a conceptual diagram illustrating an example of nodes in a cloud-computing environment, in accordance with aspects described herein.
Figure 4:
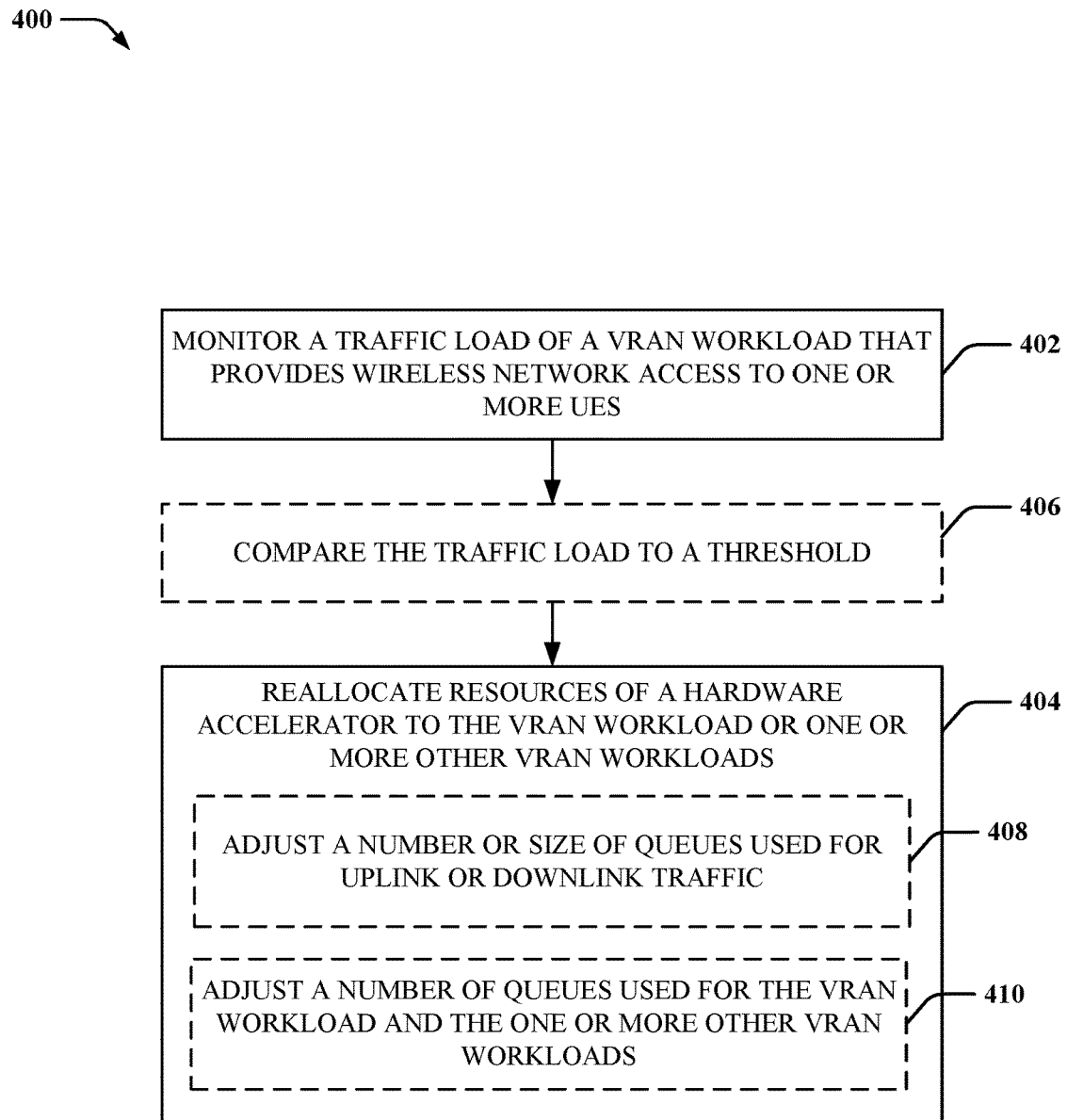
FIG. 4 is a flow diagram of an example of a method for reallocating hardware accelerator resources among virtual radio access network (vRAN) workloads based on monitoring performance of workloads, in accordance with aspects described herein.
Figure 5:
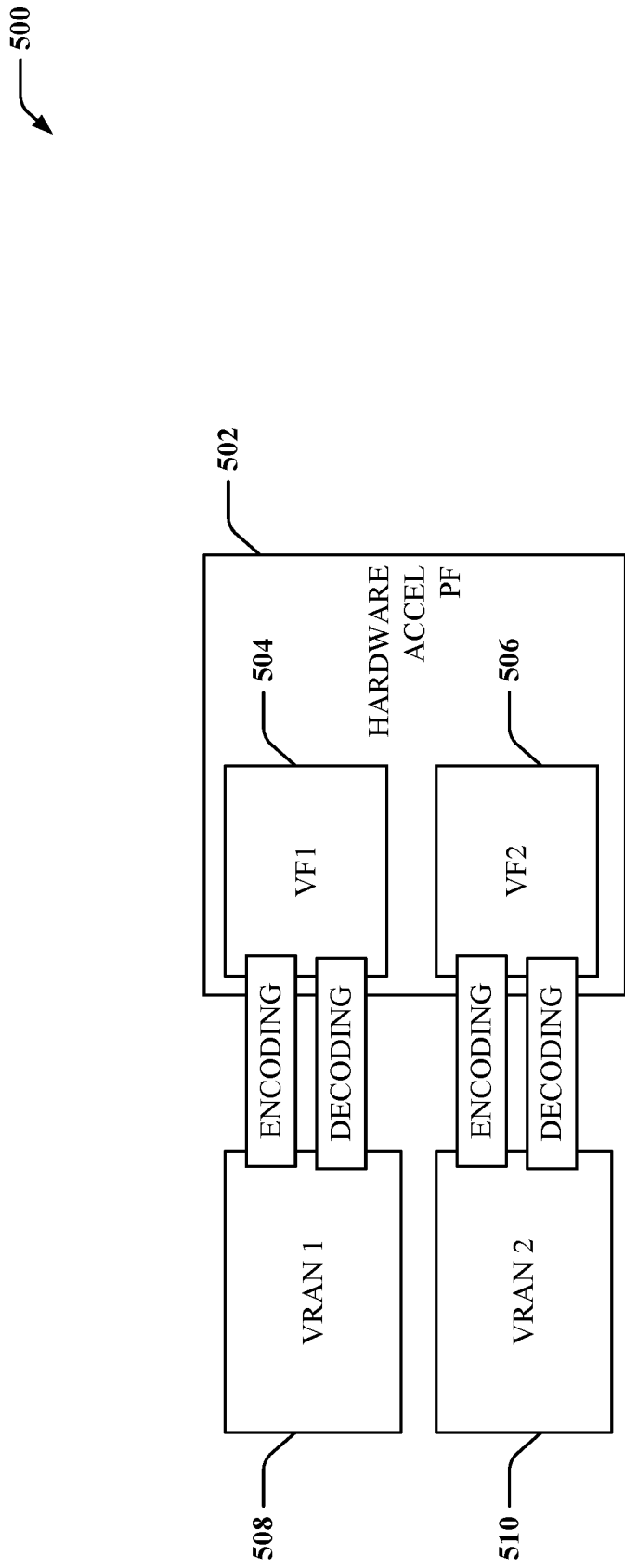
FIG. 5 is a conceptual diagram illustrating an example of a node that can include a hardware accelerator that can perform one or more functions to provide accelerated processing, in accordance with aspects described herein.
Figure 6:
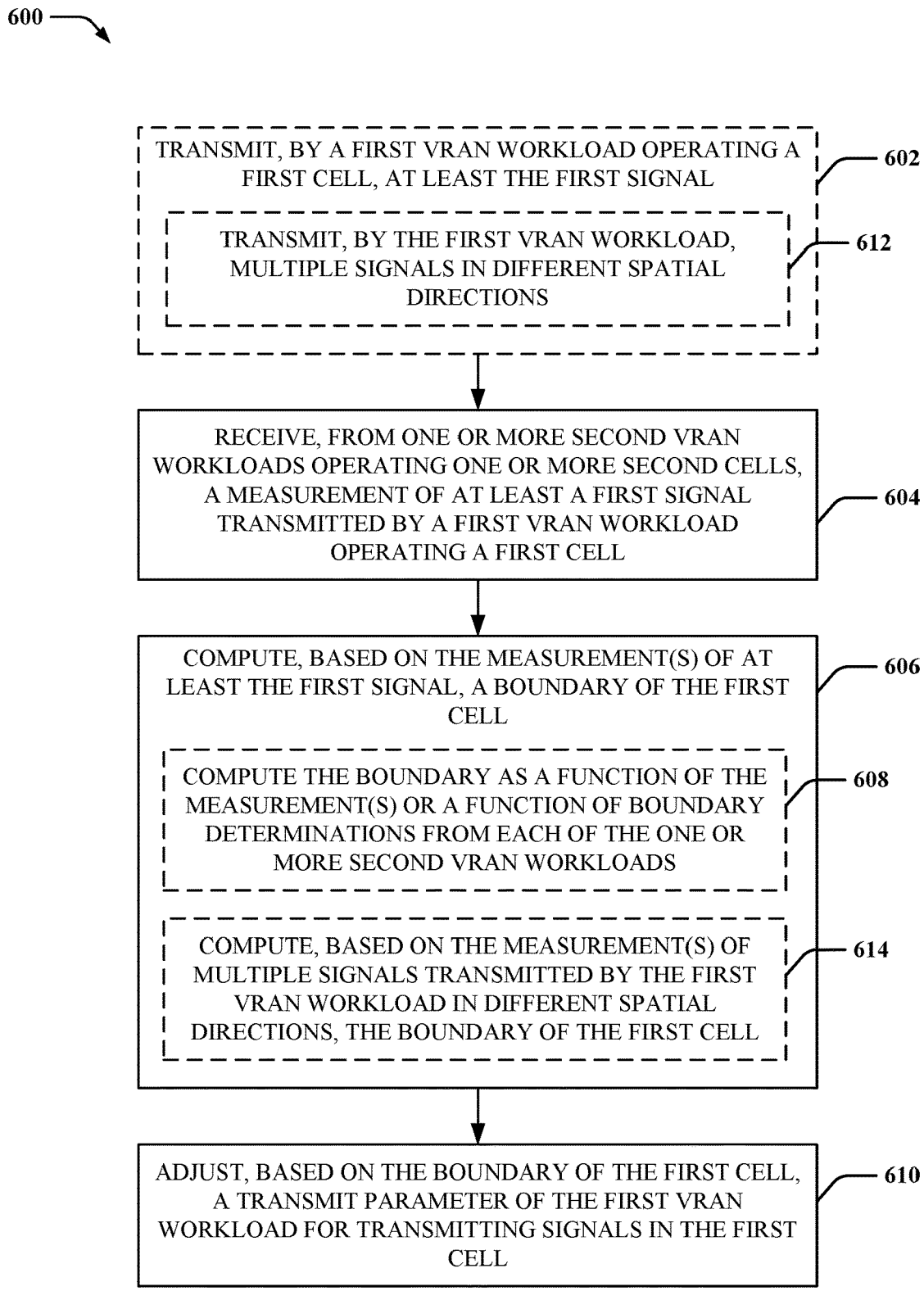
FIG. 6 is a flow diagram of an example of a method for adjusting transmit power of a vRAN workload based on signal measurements, in accordance with aspects described herein.

Turning now to FIGS. 1-7, examples are depicted with reference to one or more components and one or more methods that may perform the actions or operations described herein, where components and/or actions/operations in dashed line may be optional. Although the operations described below in FIGS. 2, 4, and 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) for performing functions related to allocating compute resources in a cloud-computing environment. In an example, device 100 can include a processor 102 and/or memory 104 configured to execute or store instructions or other parameters related to providing an operating system 106, which can execute one or more applications or processes, such as, but not limited to, at least one of a workload managing component 108 for managing workload deployment and/or resource allocation to the workloads in a cloud-computing environment 110. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein.

For example, the cloud-computing environment 110 can include various nodes 112, 114, 116, which can each be a different physical device or a different portion of a device (e.g., a processor, processor core, etc.), hardware accelerator, or other resource in the cloud-computing environment 110. In addition, in an example, device 100 can be a node itself (e.g., a physical device, portion of a device, or other resource) in the cloud-computing environment 110 and/or a device for managing resource allocation, as described herein. In an example, one or more nodes 112, 114, 116 can be edge servers or other nodes that execute a vRAN component 120 to provide a function in a 5G or other wireless network. For example, the one or more nodes 112, 114, 116 can provide a centralized unit (CU) that can be implemented in a back-end node, one or more distributed units (DUs) that can be implemented in intermediate nodes, and/or one or more remote units (RU), which can provide at least physical (PHY) and/or media access control (MAC) layers of a base station or other vRAN node of the wireless network.

In an example, workload managing component 108 can optionally include one or more of a workload monitoring component 130 for monitoring a workload, which can include monitoring one or more performance metrics of the workload or a node or other resource by which the workload is executing, a workload transferring component 132 for transferring a workload from one resource in the cloud-computing environment 110 to another, which may be to achieve one or more performance goals for the workload, a resource adjusting component 134 for adjusting resource used in executing a workload to modify a function or execution of the workload, which may be to achieve one or more performance goals for the workload, and/or a machine learning component 136 for using machine learning to determine when or where to allocation compute resources based on the monitoring.

FIG. 2 is a flowchart of an example of a method 200 for transferring execution of workloads based on monitoring performance of workloads. For example, method 200 can be performed by a device 100 and/or one or more components thereof to facilitate workload deployment or resource allocation/management in a cloud-computing environment.

In method 200, at action 202, one or more performance metrics of a vRAN workload that provides wireless network access to one or more UEs can be monitored at a first node. In an example, workload monitoring component 130 of a workload managing component 108, e.g., in conjunction with processor 102, memory 104, operating system 106, etc., can monitor, at the first node, the one or more performance metrics of the vRAN workload that provides wireless network access to one or more UEs. For example, the vRAN workload can operate one or more portions of a vRAN, such as a CU, DU, RU, etc., a PHY layer, MAC layer, etc., to provide (e.g., in conjunction with other nodes) wireless network access to the one or more UEs. In an example, the vRAN workload may be of a high priority and may require or otherwise specify a high level of service or reliability for operation. In an example, workload monitoring component 130 can monitor a resource utilization of the vRAN workload on a node, where the node can include a device, a processor of the device, a processor core of a processor of the device, etc., as described above. In another example, workload monitoring component 130 can monitor other performance metrics, such as a signal processing deadline for the vRAN workload to determine whether the signal processing deadline is being met by the vRAN workload.

In method 200, at action 204, execution of one or more non-vRAN workloads can be transferred to a second node. In an example, workload transferring component 132 of a workload managing component 108, e.g., in conjunction with processor 102, memory 104, operating system 106, etc., can transfer execution of the one or more non-vRAN workloads to the second node, which may be based on the monitoring of the one or more performance metrics of the vRAN workload. As described, for example, the vRAN workload can be of higher priority than the one or more non-vRAN workloads. Thus, to the extent the one or more non-VRAN workloads are not be afforded sufficient resources for execution or to the extent the one or more non-VRAN workloads are interfering with the vRAN workload for resource allocation or usage, the one or more non-vRAN workloads can be transferred to the second node in the cloud-computing environment. For example, the second node can also be a second device, which can be remotely located from the first node, or can be a different processor of the same device as the first node, a different core of the same processor as the first node, etc. In one example, workload transferring component 132 can determine or define a set of nodes between which workloads can be transferred. For example, the set of nodes can include the set of processor cores in a processor, the set of processors in a device, a set of physical devices deployed in a cloud-computing environment for executing workloads, etc.

In method 200, optionally at action 206, the one or more performance metrics can be compared to a threshold. In an example, workload transferring component 132 of a workload managing component 108, e.g., in conjunction with processor 102, memory 104, operating system 106, etc., can compare the one or more performance metrics to the threshold. In an example, workload transferring component 132 can transfer execution of the one or more non-vRAN workloads based on comparing the one or more performance metrics to the threshold (e.g., workload transferring component 132 can transfer execution of the one or more non-vRAN workloads where the one or more performance metrics achieve a threshold or where the one or more performance metrics do not achieve a threshold, etc.).

In one example, in comparing the one or more performance metrics to a threshold at action 206, optionally at action 208, it can be determined whether the one or more performance metrics, including a resource utilization of the vRAN workload on the first node, exceeds the threshold. In an example, workload transferring component 132 of a workload managing component 108, e.g., in conjunction with processor 102, memory 104, operating system 106, etc., can determine whether the one or more performance metrics, including the resource utilization of the vRAN workload on the first node, exceeds the threshold. For example, if the resource utilization of the vRAN workload on the first node exceeds the threshold, workload transferring component 132 can transfer the one or more non-vRAN workloads to a second node, where the second node can be used to execute vRAN and non-vRAN workloads or may be reserved for non-vRAN workloads. An example is shown in FIG. 3.

FIG. 3 illustrates an example of nodes 300 in a cloud-computing environment, where the nodes can include NODE1 302, NODE2 304, NODE3 306, and NODE4 308. For example, the NODEs 302, 304, 306, 308 can be different cores of a single CPU, different CPUs of a single physical device, different physical devices remotely deployed in a cloud-computing environment, and/or the like. In any case, for example, NODE1 302, NODE2 304, and NODE3 306 can be classified as vRAN nodes that can execute vRAN workloads and non-vRAN workloads, and NODE4 308 can be classified as a non-vRAN node reserved for executing non-vRAN workloads (e.g., lower priority or best efforts workloads when compared to vRAN workloads). In this example, NODE1 302 can be executing a vRAN workload, NODE2 304 and NODE3 306 can be executing a vRAN workload and one or more non-vRAN workloads, and NODE4 308 can be executing one or more non-vRAN workloads. In an example, where workload transferring component 132 detects that NODE2 304, or the vRAN workload executing on NODE2 304, achieves or exceeds a resource utilization threshold, workload transferring component 132 can reallocate compute resources by transferring the one or more non-vRAN workloads to another node, such as NODE1 302, NODE3 306, or NODE4 308 to allow the one or more non-vRAN workloads to execute on a node that has more resource availability for the one or more non-vRAN workloads. For example, the vRAN workloads can become intensive on resource utilization depending on a number of UEs being served. So as not to interfere with the vRAN workload and/or to allow the non-vRAN workload more resources for executing, workload transferring component 132 can determine to transfer the non-vRAN workload in certain scenarios.

For example, best effort workloads (e.g. containers) can co-exist with the vRAN workloads to improve utilization of the edge resources. Best effort workloads can run on spare cycles of a node on which the vRAN workload executes with lower priority (e.g., vRAN can yield resources when idle). Coexistence of high-priority vRAN and some best effort workloads on the same core can have negative effect to the best effort workload if vRAN load is very high (e.g. more than 85% of the core utilization). Thus, in aspects described herein, the workload transferring component 132 can provide dynamic migration of the best effort workload based on the vRAN load (e.g., transfer non-vRAN workloads when vRAN load is at least 85%). As described, for example, workload transferring component 132 can use nodes that are divided into (1) a vRAN group where the vRAN workload runs with maximum priority and non-vRAN (or best efforts) workload can run if the vRAN workload yields, and (2) a non-vRAN (or best efforts) group that are dedicated to non-vRAN (or best efforts) workloads. The non-vRAN workloads can run on a set of nodes that include non-vRAN nodes and a subset (or all) of the vRAN nodes.

In this example, workload transferring component 132 can manage the set of nodes based on resource utilization to remove vRAN nodes having at least the threshold resource utilization by the vRAN workload (e.g., at least 85%) and/or adding vRAN nodes that are below the threshold resource utilization by the vRAN workload. In this example, when workload transferring component 132 determines to transfer a non-vRAN workload from a vRAN node, it can select a different vRAN or non-vRAN node from the set. In an example, workload transferring component 132 can monitor the resource utilization of the vRAN nodes using an external service or based on signaling from the vRAN workload (e.g., the vRAN workload operating on a given node can periodically signal resource utilization to the device 100 or can signal when resource utilization achieves the threshold, etc.).

In this regard for example, in comparing the one or more performance metrics to a threshold at action 206, optionally at action 210, it can be determined whether the one or more performance metrics, including the resource utilization of the vRAN workload on the second node, exceeds the threshold. In an example, workload transferring component 132 of a workload managing component 108, e.g., in conjunction with processor 102, memory 104, operating system 106, etc., can determine whether the one or more performance metrics, including the resource utilization of the vRAN workload on the second node, exceeds (or does not exceed) the threshold. For example, where the resource utilization of the vRAN workload on the second node does not exceed the threshold, workload transferring component 132 can determine to transfer the workload to the second node. As described, this can be part of determining to include the second node in a set of nodes to which the workload transferring component 132 can transfer the non-vRAN workload.

In another example, in comparing the one or more performance metrics to a threshold at action 206, optionally at action 212, it can be determined whether the one or more performance metrics, including a signal processing deadline of the vRAN workload, exceeds a threshold. In an example, workload transferring component 132 of a workload managing component 108, e.g., in conjunction with processor 102, memory 104, operating system 106, etc., can determine whether the one or more performance metrics, including a signal processing deadline of the vRAN workload, exceeds a threshold. For example, workload transferring component 132 can determine whether the signal processing deadline exceeds the threshold a threshold number of times in a window or period of time. If so, for example, workload transferring component 132 can determine to transfer one or more non-vRAN workloads from the first node to the second node to free additional resources for the vRAN workload in an attempt to allow the vRAN workload to meet the signal processing deadline.

For example, vRAN signal processing tasks can have real-time processing requirements which, if violated, can result in dropping of a packet leading to throughput degradation. As such, the vRAN workload may have a signal processing deadline by which the vRAN workload is to process data for signal transmission (or to process received signals into data). Processing of data into signals for transmission may have multiple functions that are executed to convert the received signal into data, such as cyclic redundancy check (CRC) generation and segmentation, encoding, rate matching, scrambling, modulation mapping, layer mapping, precoding, resource mapping, inverse fast Fourier transform (IFFT), etc. Processing time of vRAN signal processing tasks can be affected by other non-vRAN workloads collocated on the same nodes (e.g., the same cores, same processors, same devices, etc.). The other non-vRAN workloads that may affect vRAN processing can include kernel threads (e.g., interrupts, worker threads, read-copy-update (RCU) callbacks, etc.), other server workloads (if allowed to run on the same nodes), etc. These other workloads can cause scheduling latencies that can cause the vRAN workload to take a long time to reclaim the CPU core once context switched, cache interference that can cause the vRAN workload to take a long time to access memory, etc. Thus, the vRAN workload can be monitored to detect such condition(s) and to transfer non-vRAN workloads to other nodes to improve signal processing timeline.

In an example, workload monitoring component 130 can initially monitor the performance of the vRAN workload, which can include maintaining and/or analyzing a histogram of runtimes for the vRAN signal processing tasks over a window or period of time. This functionality may be provided within the vRAN workload using counters or other constructs. Where workload monitoring component 132 determines that the signal processing deadline is violated (e.g., is violated greater than a certain percentage of time within the window or period of time), workload monitoring component 130 may trigger a next level of monitoring. For example, in the next level of monitoring, workload monitoring component 130 can identify additional (e.g., all) processes running on the same node (e.g., same CPU core) as the vRAN workload, and can rank the identified processes using some metric or combination of metrics based on the amount of interference they are causing. For example, the metric may include on- and off-CPU time histograms, cache utilization, total number of system calls made or scheduling events generated, etc. Information can be obtained from the host operating system of the node, for example.

In this example, workload transferring component 132 can mitigate the problem of interference by attempting to migrate the interfering processes (e.g., one or more non-vRAN workloads) to a second node. For example, in comparing the one or more performance metrics to a threshold at action 206, optionally at action 214, it can be identified whether the one or more non-vRAN workloads causes interference resulting in the signal processing deadline exceeding the threshold. In an example, workload transferring component 132 of a workload managing component 108, e.g., in conjunction with processor 102, memory 104, operating system 106, etc., can identify whether the one or more non-vRAN workloads causes interference resulting in the signal processing deadline exceeding the threshold. In an example, workload transferring component 132 can start by transferring a non-vRAN workload having a highest ranking, as described above, and/or may continue transferring additional non-vRAN workloads, until problem is resolved (e.g., until signal processing deadline is met by the vRAN workload). For example, workload transferring component 132 can migrate one non-vRAN workload to the second node and again monitor the one or more performance metrics of the vRAN workload over a similar or shorter (or longer) window or period of time to determine whether to migrate another non-vRAN workload to the second node or another node to ensure the signal processing deadline is met.

In one example, if migration is not possible for some processes (e.g. some kernel threads cannot be migrated), workload transferring component 132 can use a different mitigation strategy, such as allocate a different set of cores or more cores to the vRAN workload.

In some examples, comparing the one or more performance metrics to the threshold at action 206, and/or transferring executing of the one or more non-vRAN workloads at action 204, can be based on machine learning. For example, workload transferring component 132 can leverage machine learning component 136 to determine whether and/or when to transfer the one or more non-vRAN workloads. For example, machine learning component 136 can include a model trained on previous values for the one or more performance metrics that may or may not have resulted in transfer of workloads, and can indicate whether a trend in a collection of performance metrics (e.g., over a period of time) warrants migration of a non-vRAN workload or whether the collection of performance metrics (e.g., over the period of time) is more likely a temporary issue (and not to migrate the workload). In this example, workload transferring component 132 can provide the one or more performance metrics (e.g., values over a period of time, histogram, etc.) to the machine learning component 136, and can receive an indication of whether to transfer the non-vRAN workload(s) to mitigate potential impact to the vRAN workload or to allow the non-vRAN workload(s) to execute on another node.

In another example, comparing the one or more performance metrics to a threshold can cause monitoring of other aspects that can be used in determining whether to transfer execution of the one or more non-vRAN workloads. In method 200, optionally at action 216, based on comparing the one or more performance metrics to a threshold, one or more other aspects of the vRAN workload or the first node can be monitored at the first node. In an example, workload monitoring component 130 of a workload managing component 108, e.g., in conjunction with processor 102, memory 104, operating system 106, etc., can monitor one or more other aspects of the vRAN workload or the first node. For example, where the resource utilization exceeds the threshold at action 208, another metric can be monitored, such as a memory capacity, and the execution of the one or more non-vRAN workloads can be transferred to the second node based additionally on this other metric. For example, workload monitoring component 130 can monitor this other metric while the one or more performance metrics achieve (or do not achieve) the threshold.

FIG. 4 is a flowchart of an example of a method 400 for reallocating hardware accelerator resources among vRAN workloads based on monitoring performance of workloads. For example, method 400 can be performed by a device 100 and/or one or more components thereof to facilitate hardware accelerator resource allocation/management in a cloud-computing environment.

In method 400, at action 402, a traffic load of a vRAN workload that provides wireless network access to one or more UEs can be monitored. In an example, workload monitoring component 130 of a workload managing component 108, e.g., in conjunction with processor 102, memory 104, operating system 106, etc., can monitor the traffic load of the vRAN workload that provides wireless network access to the one or more UEs. For example, as described, the vRAN workload can operate one or more portions of a vRAN, such as a CU, DU, RU, etc., a PHY layer, MAC layer, etc., to provide (e.g., in conjunction with other nodes) wireless network access to the one or more UEs. In an example, workload monitoring component 130 can monitor the traffic load of the vRAN workload as a number of UEs being served by the vRAN workload, a number of requests from the UEs in a window or period of time, a number of outstanding requests from the UEs at a given point in time, etc. In other examples, workload monitoring component 130 can monitor the traffic load of the vRAN workload as a resource utilization, number of times a signal processing deadline is violated, etc., as described above. In addition, the traffic load can correspond to an actual traffic load measured over a period of time or time instant, or can correspond to a predicted traffic load for a future window of time, which may be predicted based on historical traffic load for a similar time or time period (e.g., at the vRAN workload or one or more other vRAN workloads), etc.

In method 400, at action 404, resources of a hardware accelerator can be reallocated to the vRAN workload or one or more other vRAN workloads. In an example, resource adjusting component 134 of a workload managing component 108, e.g., in conjunction with processor 102, memory 104, operating system 106, etc., can reallocate the resources of the hardware accelerator to the vRAN workload or the one or more other vRAN workloads (e.g., executing on different nodes), which may be based on monitoring of the traffic load. For example, in method 400, optionally at action 406, the traffic load can be compared to a threshold. In an example, resource adjusting component 134 of a workload managing component 108, e.g., in conjunction with processor 102, memory 104, operating system 106, etc., can compare the traffic load to the threshold in determining to reallocate the resources of the hardware accelerator. For example, if the traffic load achieves the threshold, resource adjusting component 134 can reallocate hardware accelerator resources to the vRAN workload, or if the traffic load does not achieve the threshold, resource adjusting component 134 can reallocate hardware accelerator resources from the vRAN workload to other workloads (e.g., other vRAN workloads).

For example, in reallocating the resources of the hardware accelerator at action 404, optionally at action 408, a number or size of queues used for uplink or downlink traffic can be adjusted. In an example, resource adjusting component 134 of a workload managing component 108, e.g., in conjunction with processor 102, memory 104, operating system 106, etc., can adjust (e.g., for the vRAN workload) the number or size of queues used for uplink or downlink traffic. Thus, for example, where resource adjusting component 134 determines that the traffic load includes high uplink traffic, resource adjusting component 134 can reallocate a number of size of queues in the hardware accelerator for uplink traffic (e.g., from downlink traffic).

In another example, in reallocating the resources of the hardware accelerator at action 404, optionally at action 410, a number of queues used for the vRAN workload and the one or more other vRAN workloads can be adjusted. In an example, resource adjusting component 134 of a workload managing component 108, e.g., in conjunction with processor 102, memory 104, operating system 106, etc., can adjust the number of queues used for the vRAN workload and the one or more other vRAN workloads, which can include moving queues to the vRAN workload from the one or more other vRAN workloads (e.g., where the vRAN workload has high traffic load), or moving queues from the vRAN workload to the one or more other vRAN workloads (e.g., where the one or more other vRAN workload has high traffic load), etc. An example is shown in FIG. 5.

FIG. 5 illustrates an example of a node 500 that can include a hardware accelerator physical function (PF) 502 that can perform one or more functions to provide accelerated processing. The PF 502 can include multiple virtual functions (VFs) 504, 506 to be shared by multiple vRAN workloads 508, 510. For example, the PF 502 can perform signal processing functions for the vRAN workloads 508, 510 to improve performance thereof, such as low density parity check (LDPC) encoding/decoding. The hardware accelerator can have priority queues to process incoming requests, such as multiple encoding queues for different quality-of-service levels of downlink traffic. The PF 502 can be virtualized, as described, such that the available accelerator resources (e.g., number of queues, memory, etc.) are split among the VFs 504, 506.

In some examples, however, traffic load of vRAN workload, such as part of a baseband unit (BBU) pool and/or cells within pools, can change dynamically over time. The changes may correspond to time-of-day (e.g., on-peak and off-peak times) or other diurnal patterns (e.g., office vs home), short-term surges in uplink/downlink traffic (e.g., increase in uplink traffic during an event, as people are uploading photos and videos to the social media), etc. The vRAN workload(s) can typically be provisioned statically for the use of the hardware accelerators and/or a fixed number of VFs provided by a server or fixed number of priority queues and queue sizes for incoming requests. This static provisioning can lead to underutilization of the compute resources such that cells may not be able to go beyond certain traffic capacity even though the hardware accelerator might have free resources.

As such, the examples described above and further herein allow resource adjusting component 134 to reallocate hardware accelerator resources based on monitoring performance metrics of the vRAN workload(s). For example, hardware monitoring component 130 can monitor the average traffic load of the vRAN workload on a periodic basis (e.g., every hour), and resource adjusting component 134 can reallocate the resources of the hardware accelerator based on the traffic demands. For example, there can be multiple levels of dynamic reallocation of hardware accelerator resources, such as reallocation within a BBU pool (intra-BBU pool) and reallocation among BBU pools (inter-BBU pool).

For intra-BBU pool reallocation, resource adjusting component 134 can adjust of the number/size of queues used for uplink/downlink traffic based on utilization, as described. For example, if total downlink utilization of the BBU pool is less than a first threshold and/or total uplink utilization of the BBU pool is greater than a second threshold, resource adjusting component 134 can reallocate resources of the hardware accelerator (e.g., a percentage of the total resources of the hardware accelerator) from downlink to uplink for a given one or more vRAN workloads. Similarly, for example, if total uplink utilization of the BBU pool is less than a third threshold and/or total downlink utilization of the BBU pool is greater than a fourth threshold, resource adjusting component 134 can reallocate resources of the hardware accelerator (e.g., a percentage of the total resources of the hardware accelerator) from uplink to downlink for a given one or more vRAN workloads.

For inter-BBU pool reallocation, resource adjusting component can adjust the number of queues allocated to each vRAN workload or each corresponding VF (e.g., VFs 504, 506). In this example, resource adjusting component 134 can allocate the total number of unused resources from the previous period proportionally to the utilization of the VFs during that period.

In some examples, comparing the traffic load to the threshold at action 406, and/or reallocating the resources of the hardware accelerator at action 404, can be based on machine learning. For example, resource adjusting component 134 can leverage machine learning component 136 to determine whether and/or when to reallocate the hardware accelerator resources, as described above. For example, machine learning component 136 can include a model trained on previous values for traffic load that may or may not have resulted in reallocation of hardware accelerator resources, and can indicate whether a trend in the traffic load (e.g., over a period of time) warrants reallocation of hardware accelerator resources or whether the traffic load (e.g., over the period of time) is more likely a temporary issue (and not to reallocate the resources). In this example, resource adjusting component 134 can provide the traffic load (e.g., values over a period of time, histogram, etc.) to the machine learning component 136, and can receive an indication of whether reallocate the hardware accelerator resources (e.g., among uplink and downlink traffic or among vRAN workloads, etc.).

FIG. 6 is a flowchart of an example of a method 600 for adjusting transmit power of a vRAN workload based on signal measurements. For example, method 600 can be performed by a device 100 and/or one or more components thereof to facilitate vRAN operation or corresponding resource allocation/management in a cloud-computing environment.

In method 600, optionally at action 602, at least a first signal can be transmitted by a first vRAN workload operating a first cell. In an example, a vRAN component 120 of a node can transmit at least the first signal. In one example, workload monitoring component 130 of a workload managing component 108, e.g., in conjunction with processor 102, memory 104, operating system 106, etc., may cause the vRAN component 120 to transmit the first signal, such to facilitate measurement thereof by other vRAN workloads operating nearby cells for the purposes described herein. In an example, other vRAN components 120 of other nodes can receive and measure the signal from the first vRAN workload, and can report the signal measurement to device 100.

In method 600, at action 604, a measurement of at least a first signal transmitted by a first vRAN workload operating a first cell can be received from one or more second vRAN workloads operating one or more second cells. In an example, workload monitoring component 130 of a workload managing component 108, e.g., in conjunction with processor 102, memory 104, operating system 106, etc., can receive, from the one or more second vRAN workloads operating one or more second cells, a measurement of at least a first signal transmitted by the first vRAN workload operating the first cell. For example, the measurements can include an indication of strength or quality of the signal, a measurement of an I or Q sample of the raw signal as received, an analysis of the signal constellation and whether the signal is of a certain quality as received, etc. In addition, the received signal can be the signal transmitted by the first cell at action 602, which can be caused by the workload monitoring component 130 prompting the vRAN workload to send the signal, or can be another signal transmitted by the vRAN workload (e.g., to one or more UEs), which may include a reference signal or other control or data signal.

In method 600, at action 606, a boundary of the first cell can be computed based on the measurement(s) of at least the first signal. In an example, resource adjusting component 134 of a workload managing component 108, e.g., in conjunction with processor 102, memory 104, operating system 106, etc., can compute, based on the measurement(s) of at least the first signal, the boundary of the first cell. In one example, in computing the boundary at action 606, optionally at action 608, the boundary can be computed as a function of the measurement(s) or a function of the boundary determinations from each of the one or more second vRAN workloads. In an example, resource adjusting component 134 of a workload managing component 108, e.g., in conjunction with processor 102, memory 104, operating system 106, etc., can compute the boundary as a function of the measurement(s) or a function of the boundary determinations from each of the one or more second vRAN workloads. For example, the one or more second vRAN workloads can report the signal measurements of the first signal or can make a boundary determination of the first cell based on the signal measurement and report the boundary determination. In either case, resource adjusting component 134 can compute a more complete boundary determination for the first cell based on information reported by multiple second vRAN workloads.

In method 600, at action 610, a transmit parameter of the first vRAN workload for transmitting signals in the first cell can be adjusted based on the boundary of the first cell. In an example, resource adjusting component 134 of a workload managing component 108, e.g., in conjunction with processor 102, memory 104, operating system 106, etc., can adjust, based on the boundary of the first cell, the transmit parameter of the first vRAN workload for transmitting signals in the first cell, or resource adjusting component 134 can cause the first vRAN workload to adjust its transmit parameter. For example, the transmit parameter may be a transmit power, a modulation, etc., and resource adjusting component 134 can determine a transmit power or modulation adjustment to increase or decrease the boundary (e.g., the signal strength or quality) of the first cell. In an example, the boundary of the first cell can change based on presence or absence (or mobility) of an object blocking or reflecting signals from the vRAN workload in the first cell. The change in boundary can be detected based on the received signal measurements. In another example, a new cell can be added, and this can result in determining a change in boundary for the first cell. In any case, based on detecting the boundary and/or determining to increase or decrease the boundary of the first cell, resource adjusting component 134 can increase or decrease transmit power or modulation used by the first vRAN workload.

In another example, in transmitting at least the first signal at action 602, optionally at action 612, multiple signals can be transmitted by the first vRAN workload in different spatial directions. In an example, a vRAN component 120 of a node can transmit the multiple signals. In one example, workload monitoring component 130 of a workload managing component 108, e.g., in conjunction with processor 102, memory 104, operating system 106, etc., may cause the vRAN component 120 to transmit the multiple signals, such to facilitate measurement thereof by other vRAN workloads operating nearby cells for the purposes described herein. In this example, in computing the boundary at action 606, optionally at action 614, the boundary of the first cell can be computed based on the measurement(s) of multiple signals transmitted by the first vRAN workload in different spatial directions. In an example, resource adjusting component 134 of a workload managing component 108, e.g., in conjunction with processor 102, memory 104, operating system 106, etc., can compute, based on the measurement(s) of multiple signals transmitted by the first vRAN workload in different spatial directions, the boundary of the first cell. This can allow for more accurate computation of the boundary based on each of the one or more second vRAN workloads measuring the multiple signals and knowing the spatial direction of each of the multiple signals (e.g., based on location of the second cells with respect to the first cell). In addition, in this example, resource adjusting component 134 can adjust the transmit parameter of the first vRAN workload individually for one or more of the spatial directions to modify the boundary in the certain spatial direction.

For example, traditionally, cellular network planning can involve measuring receive signal strengths in the coverage area to determine the cell boundary and adjusting the cell transmission power, which can require human labour. With vRAN, neighboring cells can be used as signal collectors, which can jointly estimate the receive signal strengths at the coverage area. For example, the first cell can send out signals in particular patterns, which can be known by, or configured to, multiple other cells. The multiple other cells can receive the signals with different signal strengths, which can be used to jointly compute the estimated receive signal strength at different directions from the first cell. If massive multiple-input multiple-output (MIMO) is used, for example, the first cell can send out different signals at different directions. The other cells can derive more accurate estimation on the receive signal strength at different directions.

In some examples, adjusting the transmit parameter at action 610 can be based on machine learning. For example, resource adjusting component 134 can leverage machine learning component 136 to determine whether and/or when (and/or how much) to adjust the transmit parameter. For example, machine learning component 136 can include a model trained on previous values for the received signal strength and corresponding transmit parameter adjustments, and can indicate the transmit parameter adjustment based on the received signal strength values In this example, resource adjusting component 134 can provide the reported signal strengths to the machine learning component 136, and can receive an indication of a transmit parameter adjustment to achieve a desired boundary (e.g., in one or more spatial directions corresponding to the signal(s)).

Figure 7:
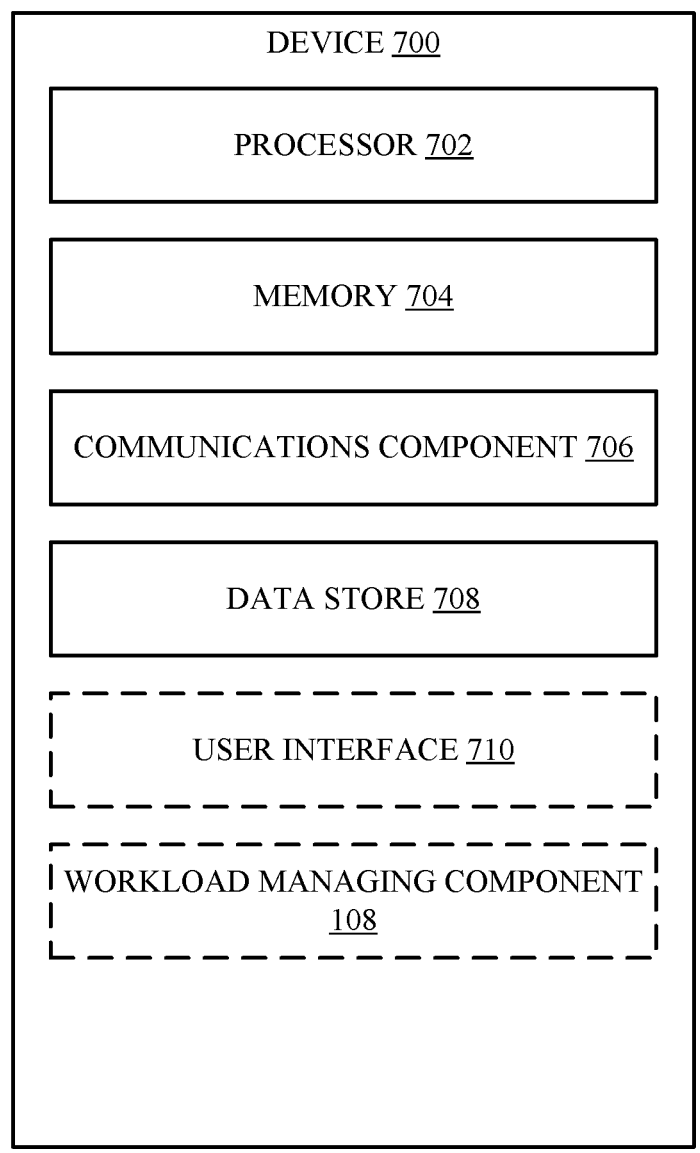
FIG. 7 is a schematic diagram of an example of a device for performing functions described herein, in accordance with aspects described herein.

FIG. 7 illustrates an example of device 700 including additional optional component details as those shown in FIG. 1. In one aspect, device 700 may include processor 702, which may be similar to processor 102 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory 104 such as for storing local versions of operating systems (or components thereof) and/or applications being executed by processor 702, such as a workload managing component 108, etc. Memory 704 can include a type of memory usable by a computer, such as random access memory (RAM), read only memory (ROM), tapes, magnetic discs, optical discs, volatile memory, non-volatile memory, and any combination thereof.

Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc.) not currently being executed by processor 702. In addition, data store 708 may be a data repository for workload managing component 108, and/or one or more other components of the device 700.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 may additionally include a workload managing component 108 for managing workloads or related compute resource allocation, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for reallocating resources among nodes in a cloud-computing environment, comprising:
    monitoring, at a first node in the cloud-computing environment, one or more performance metrics of a virtual radio access network (vRAN) workload that provides wireless network access to one or more user equipment (UEs); and
    based on determining that the one or more performance metrics, including a signal processing deadline of the vRAN workload, exceeds a threshold a given number of times within a window of time, transferring execution of one or more non-vRAN workloads, executing on the first node, to a second node in the cloud-computing environment.

2. The computer-implemented method of claim 1, further comprising identifying, based at least in part on determining that the signal processing deadline exceeds the threshold, the one or more non-vRAN workloads executing on the first node as causing interference resulting in the signal processing deadline exceeding the threshold, wherein transferring execution of the one or more non-vRAN workloads is based on identifying the one or more non-vRAN workloads as causing interference.

3. The computer-implemented method of claim 2, wherein identifying the one or more non-vRAN workloads as causing interference is based on analyzing, for the one or more non-vRAN workloads, a processor utilization time histogram, a cache utilization, a number of system calls, or a number of generated scheduling events.

4. The computer-implemented method of claim 3, wherein analyzing, for the one or more non-vRAN workloads, includes comparing the processor utilization time histogram, the cache utilization, the number of system calls, or the number of generated scheduling events to one or more thresholds.

5. The computer-implemented method of claim 1, wherein transferring execution of the one or more non-vRAN workloads to the second node includes transferring multiple non-vRAN workloads to the second node, or other nodes, until the signal processing deadline does not exceed the threshold the given number of times within the window of time.

6. The computer-implemented method of claim 1, wherein the first node and the second node are one of cores of a processor, processors of a device, or devices in the cloud-computing environment.

7. The computer-implemented method of claim 1, wherein comparing the one or more performance metrics includes using machine learning to compare the one or more performance metrics based on a trained model of performance metrics that resulted in transferring workloads.

8. The computer-implemented method of claim 1, wherein the vRAN workload provides one or more of a centralized unit (CU) function, a distributed unit (DU) function, or a remote unit (RU) function in a mobile edge computing environment.

9. A device for reallocating resources among nodes in a cloud-computing environment, comprising:
a memory storing one or more parameters or instructions for reallocating resources among cores in the cloud-computing environment; and
at least one processor coupled to the memory, wherein the at least one processor is configured to:
monitor, at a first node in the cloud-computing environment, one or more performance metrics of a virtual radio access network (vRAN) workload that provides wireless network access to one or more user equipment (UEs); and
based on the one or more performance metrics, including a signal processing deadline of the vRAN workload, exceeding a threshold a given number of times within a window of time, transfer execution of one or more non-vRAN workloads, executing on the first node, to a second node in the cloud-computing environment based on a resource availability at the second node.

10. The device of claim 9, wherein the at least one processor is configured to transfer execution of the one or more non-vRAN workloads based on identifying, when the signal processing deadline exceeds the threshold, the one or more non-vRAN workloads executing on the first node as causing interference resulting in the signal processing deadline exceeding the threshold.

11. The device of claim 10, wherein the at least one processor is configured to identify the one or more non-vRAN workloads as causing interference based on analyzing, for the one or more non-vRAN workloads, a processor utilization time histogram, a cache utilization, a number of system calls, or a number of generated scheduling events.

12. The device of claim 11, wherein the at least one processor is configured to analyze, for the one or more non-vRAN workloads, at least in part by comparing the processor utilization time histogram, the cache utilization, the number of system calls, or the number of generated scheduling events to one or more thresholds.

13. The device of claim 9, wherein the at least one processor is configured to transfer execution of the one or more non-vRAN workloads to the second node at least in part by transferring multiple non-vRAN workloads to the second node, or other nodes, until the signal processing deadline does not exceed the threshold the given number of times within the window of time.

14. The device of claim 9, wherein the first node and the second node are one of cores of a processor, processors of a device, or devices in the cloud-computing environment.

15. The device of claim 9, wherein the at least one processor is configured to compare the one or more performance metrics at least in part by using machine learning to compare the one or more performance metrics based on a trained model of performance metrics that resulted in transferring workloads.

16. The device of claim 9, wherein the vRAN workload provides one or more of a centralized unit (CU) function, a distributed unit (DU) function, or a remote unit (RU) function in a mobile edge computing environment.

17. A non-transitory computer-readable medium, comprising code executable by one or more processors for reallocating resources among nodes in a cloud-computing environment, the code comprising code for:
monitoring, at a first node in the cloud-computing environment, one or more performance metrics of a virtual radio access network (vRAN) workload that provides wireless network access to one or more user equipment (UEs);
comparing the one or more performance metrics to a threshold; and
when the one or more performance metrics, including a signal processing deadline of the vRAN workload, exceeds the threshold a given number of times within a window of time, transferring execution of one or more non-vRAN workloads, executing on the first node, to a second node that has more resource availability for the one or more non-vRAN workload than the first node.

18. The non-transitory computer-readable medium of claim 17, wherein transferring execution of the one or more non-vRAN workloads is based on identifying, when the signal processing deadline exceeds the threshold, the one or more non-vRAN workloads executing on the first node as causing interference resulting in the signal processing deadline exceeding the threshold.

19. The non-transitory computer-readable medium of claim 17, wherein transferring execution of the one or more non-vRAN workloads to the second node includes transferring multiple non-vRAN workloads to the second node, or other nodes, until the signal processing deadline does not exceed the threshold the given number of times within the window of time.

20. The non-transitory computer-readable medium of claim 17, wherein the first node and the second node are one of cores of a processor, processors of a device, or devices in the cloud-computing environment.

* * * * *